Jan. 31, 1939.    R. J. WATERWORTH    2,145,616
MEANS AND METHOD OF OPERATING ELECTRIC MOTORS
Filed July 2, 1936

INVENTOR.
ROBERT J. WATERWORTH.
BY Allen & Allen
ATTORNEYS.

Patented Jan. 31, 1939

2,145,616

UNITED STATES PATENT OFFICE 2,145,616

MEANS AND METHOD OF OPERATING ELECTRIC MOTORS

Robert J. Waterworth, Sidney, Ohio, assignor to The Crosley Corporation, a corporation of Ohio Application July 2, 1936, Serial No. 88,673

9 Claims. (Cl. 172—239)

My invention relates to a novel mode of operating electric motors and to a novel circuit therefor providing not only a safety feature, but also means for the removal of an obstruction to the operation of the motor. Specifically I provide means whereby an electric motor if stalled by some obstruction to its operation, will not only come to rest but will start rotating in the opposite or reverse direction automatically, whereby to remove the obstruction. I also provide in connection with my invention, means whereby the setting of the motor for reverse operation upon the occurrence of an obstruction, is accomplished automatically.

I shall describe my invention in an exemplary embodiment which is a motor and associated circuits and devices arranged for the operation of a wringer for clothing, for or in connection with a household washing machine, it being understood that this particular use or embodiment is exemplary only of the utility of my device, and is not to be taken in a limiting sense.

It is a specific object of my invention as applied to such a motor, to provide means whereby if an obstruction occurs in the wringer the motor will stall and will immediately start rotating in the opposite direction so as to cause the wringer to discharge the obstruction.

The various objects of my invention I accomplish by that certain construction and arrangement of parts of which I shall now describe the aforesaid exemplary embodiment. For a better understanding of the invention, reference is now made to the drawing wherein.

My invention is applicable to motors of types having main or running windings and supplementary or starting windings, which latter windings are cut out of the circuit when the motor attains full operating speed. Exemplary of such a motor is the well-known split phase alternating current motor having starting coils which are cut out of the circuit by a centrifugal mechanism when the speed of the motor reaches a certain value. It will be understood that my invention may be applied to other motors than the exemplary one in connection with which I shall describe it.

Briefly in the practice of my invention, I provide means whereby upon the starting of a motor the main or running coils may be connected to a source of power as is usual, and whereby the starting coils may likewise be connected to a source of power for starting the motor in the forward direction. I provide means whereby, thereafter and as soon as the motor attains speed, another series of connections may be effected in which the running coils remain connected as before but the power lead connections to the starting coils are reversed.

It will be understood that as soon as the motor attains speed the starting coils are cut out of electrical connection with the power sources by the centrifugal switch referred to, so that connecting these coils to the power source in reverse has no effect on the normal operation of the motor. When an obstruction enters the wringer however, and the speed of the motor is cut down thereby to the point where the centrifugal switch cuts the starting coils back into the circuit, the effect of these coils will be to start the motor operating in the reverse direction, whereby to discharge the obstruction.

Figure 1:
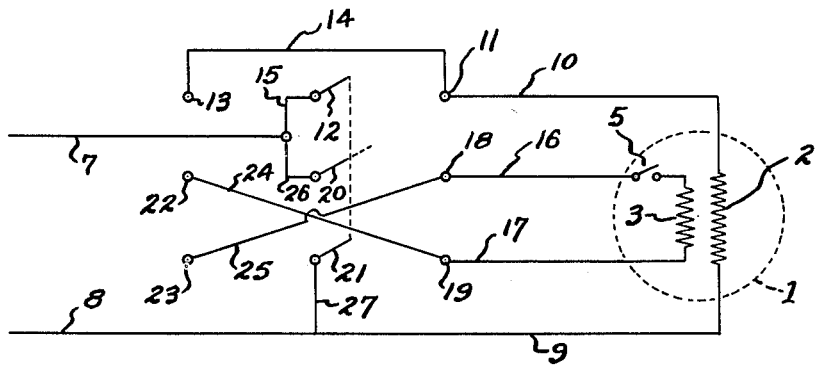
Fig. 1 is a circuit diagram of the motor and its connections.

The circuit for this is illustrated in Fig. 1, where the motor 1, diagrammatically illustrated is shown as having a running winding 2 and a starting winding 3. The centrifugal switch, being as indicated, of any of the well known commercial forms, is indicated at 5. The switching arrangement for accomplishing the purpose of my invention is shown as a triple pole double throw switch for purposes of illustration. The power leads are indicated at 7 and 8. One pole of the running winding 2 is connected directly to a power lead by the lead 9. The other pole is connected by the lead 10 to a contact 11 for the knife 12 of the switch aforesaid, and the opposite contact 13 for this knife is connected to the contact 11 by a suitable wire or bus 14, so that in either position of the knife 12, the same circuit connection will be made to the lead 10. The knife 12 is of course, connected by a lead 15 to the power lead 7. The leads 16 and 17 from the starting coil 3 are brought out to contacts 18 and 19 respectively for knives 20 and 21 of the switch. The opposite contacts 22 and 23 for these knives are connected to contacts 18 and 19 by crossing wires or buses 24 and 25, being representative of the usual type of reversing connection when employing a double pole double throw switch. The knife 20 is connected by means of a lead 26 to the power lead 7 and the knife 21 is connected by a lead 27 to the power lead 8.

When the switch in Fig. 1 is thrown to the right, current is applied to the leads 9 and 10 of the running winding 2, and current is also supplied to the leads 16 and 17 of the starting coil 3 for the operation of the motor in the forward direction. As soon as the motor attains speed, the centrifugal switch 5 automatically cuts out, disconnecting the starting winding 3. When, during the operation of the motor, the switch is thrown to the left in Fig. 1, the current connections to the running windings 2 remain the same as before, but the current connections to the starting coil 3 are reversed as hereinabove explained. This however, has no effect on the normal operation of the motor because starting winding 3 remains disconnected at the centrifugal switch 5. The reverse current connections thereto however, do become effective, as also explained when the motor for any reason slows down sufficiently to allow the centrifugal switch to close.

Figure 3:
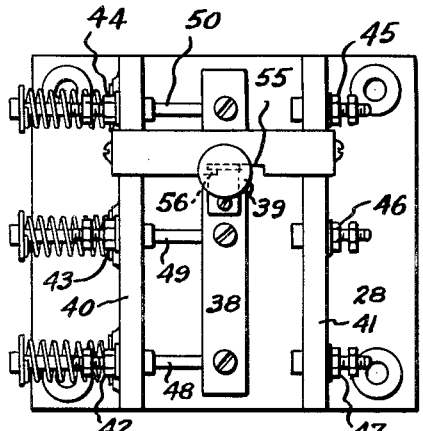
Fig. 3 is a plan view thereof.
Figure 2:
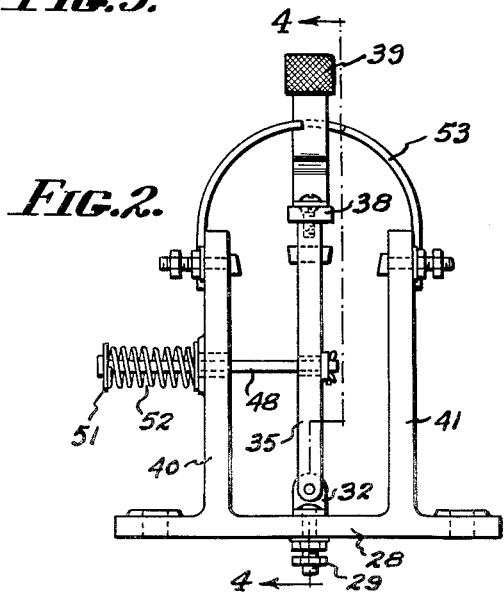
Fig. 2 is a side elevation of an exemplary switch mechanism which may be employed in the practice of my invention.
Figure 4:
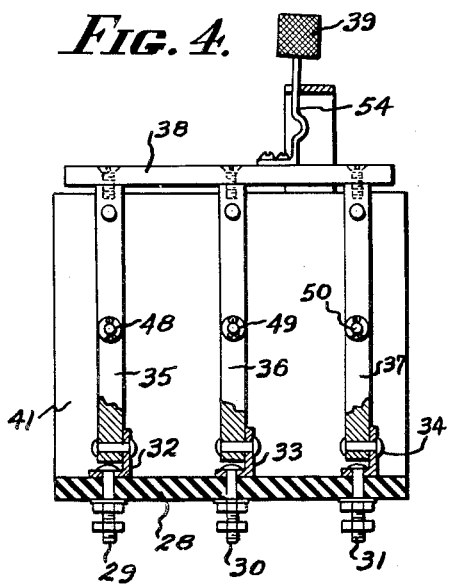
Fig. 4 is a semi-sectional elevation taken along the lines 4—4 of Fig. 2.

In the operation of a system of this character, it is desirable to have the operation of the switch automatic in the sense of requiring nothing more on the part of the operator than the operation normally required in starting the motor. Various forms of switching means may be employed, and it will be within the purview of my invention to provide automatic means for throwing over the appropriate switch after current has been applied to the motor in any desired way. Such an automatic contrivance may be built into the motor if desired. Also, of course, a manually operated switch may be built into the motor if the motor is located in the position of convenient access to the operator. However, it is convenient to provide a manually operated switch which must be actuated to start the motor but which, when released by the operator, will assume the desired running position automatically, as for example, under the influence of a spring. Such a switch does not require extra operations on the part of the operator and can be located where desired. Moreover, as will be apparent from Fig. 1, only four leads from the switch to the motor are required, and split phase motors are ordinarily made with four terminals, i. e., two for the running windings and two for the starting windings, so that these may be connected together in different ways for the operation of the motor in either direction. A simple spring actuated double throw switch therefore is all that is required in my apparatus beyond what would normally be provided in any motor driven device. One such switch is illustrated in Figs. 2 to 4. Here on a suitable base 28, I have shown the contact means 29, 30 and 31 connected with the pivoting brackets 32, 33 and 34, for the knife members 35, 36 and 37 of a triple pole double throw switch. These in turn are connected to the common insulating bar 38, having an operating handle 39. Two interspaced vertical panels 40 and 41 of insulating substance are provided, and these bear, respectively, three contact members each, shown at 42, 43, 44, 45, 46 and 47, adapted as illustrated, to come selectively into contact with contact members on the knives 35, 36 and 37.

Spring arrangements for urging the knife switch in one direction may consist of rods 48, 49 and 50 connected to the knives, passing through the panel 40 and having heads 51 on their ends between which and the panel 40 there are placed compression springs 52.

In the figures the position of the knife switch, which it assumes under the influence of these springs, is a position to the left. In order to provide a neutral or off position, whereby to eliminate the necessity of the provision of a separate on and off switch for the motor, I may attach a keeper 53 to the panels 40 and 41, mount the handle 39 on a resilient strip 54 and then slot the keeper as most clearly is shown at 55 in Fig. 3, so that the resilient strip may be depressed into the slot, and if desired, retained by a tooth 56, so as to hold it in the open or neutral position.

In operation, the handle 39 will be moved to the right in the figures, thereby disengaging the strip 54 from the slot 55, and thereby closing the knife switch in the right-hand direction. The motor immediately starts operating and rapidly attains speed. Thereupon the operator merely releases the handle 39; and the knife switch flies over to the left-hand position under the influence of the springs 52. In stopping the motor the operator merely opens the knife switch and depresses the strip 54 into the slot 55.

It will be understood that the switch shown is illustrative only of the various types of swtiches which I may employ, but is set forth as showing a fully operating structure characterized by the provision of means to assume the desired running position after initial actuation to start the motor in the forward direction.

Modification may be made in my invention without departing from the spirit thereof.

Having thus described my invention, what I claim as new and desire to secure by Letters Patent is:

1. In combination a motor having starting windings and running windings, a centrifugal means for disconnecting said starting windings when said motor attains speed, switching means having a plurality of positions in one of which positions the running windings and starting windings are connected to a power source for energization in the forward direction and in another of which positions the running windings are connected as before, but the starting windings are reversed, and automatic means for bringing said switching means from the first mentioned position to the second mentioned position upon release thereof.

2. In combination a motor having starting windings and running windings, a centrifugal means for disconnecting said starting windings when said motor attains speed, switching means having a plurality of positions in one of which positions the running windings and starting windings are connected to a power source for energization in the forward direction and in another of which positions the running windings are connected as before, but the starting windings are reversed, said switching means comprising a knife switch of the double throw type and spring means for urging said switch from one position to another upon release thereof.

3. In combination a motor having starting windings and running windings, a centrifugal means for disconnecting said starting windings when said motor attains speed, switching means having a plurality of positions in one of which positions the running windings and starting windings are connected to a power source for energization in the forward direction and in another of which positions the running windings are connected as before, but the starting windings are reversed, said switching means comprising a triple pole double throw knife switch, opposed contacts therefor and spring means for urging said switch into a position of contact selectively with one set of said contacts.

4. In combination a motor having starting windings and running windings, a centrifugal means for disconnecting said starting windings when said motor attains speed, switching means having a plurality of positions in one of which positions the running windings and starting windings are connected to a power source for energization in the forward direction and in another of which positions the running windings are connected as before, but the starting windings are reversed, said switching means comprising a triple pole double throw knife switch, opposed contacts therefor and spring means for urging said switch into a position of contact selectively with one set of said contacts, and manually actuable means for retaining said switch in an open position.

5. In combination a motor having running windings and starting windings and a centrifugal switch for disconnecting said starting windings when said motor attains speed, a triple pole double throw switch having power terminals, a connection between one of said power terminals and a terminal of said running winding and a terminal of one of the throw members of said switch, means for connecting the other of said power terminals to the other two throw members on said switch, means for connecting the other terminals of said running winding to the opposed switch terminals for one of the throw members connected to said last mentioned power terminal, and means for connecting the starting windings of said motor to the other terminals of said switch so as to effect selectively reversed connections thereto dependent on the position of said switch.

6. In combination a motor having starting windings and running windings, means to connect said starting windings and running windings for rotation in the forward direction, means to disconnect said starting windings when said motor attains a predetermined speed, and means to effect a reversed current connection to said starting windings incident to the release of said connecting means, whereby said motor will operate in a reversed direction when its speed drops below said predetermined value.

7. In combination a motor having starting windings and running windings, switching means having a plurality of positions in one of which positions the running windings and starting windings are connected to a power source for energization in the forward direction and in another of which positions the running windings are connected as before but the starting windings are reversed, a centrifugal means for disconnecting said starting windings when said motor attains a certain speed, and means operative incident to the removal of said switching means from said one position to throw it to said reversed position, whereby said motor will operate in a reversed direction when its speed drops below said certain value.

8. In combination a motor having starting windings and running windings, switching means having a plurality of positions in one of which positions the running windings and starting windings are connected to a power source for energization in the forward direction and in another of which positions the running windings are connected as before but the starting windings are reversed, and in another of which positions said motor is disconnected, a centrifugal means for disconnecting said starting windings when said motor attains a certain speed, and means operative incident to the removal of said switching means from said one position to throw it to said reversed position, whereby said motor will operate in a reversed direction when its speed drops below said certain value.

9. In control means for a combined wringer and washing machine having a split phase motor with starting windings and running windings and switch means, responsive to the attainment by the motor of a predetermined speed, automatically to de-energize said starting windings, said motor being adapted to rotate in opposite directions to reverse the direction of rotation of the wringer rolls; switch means adapted to be manually operated to complete the circuits of the running windings and starting windings for rotation of the motor in one direction, and adapted, upon release, to automatically reverse the polarity of the starting windings whereby, upon stalling of the motor, the direction of rotation of the motor will be reversed.

ROBERT J. WATERWORTH.